United States Patent Office 3,356,594
Patented Dec. 5, 1967

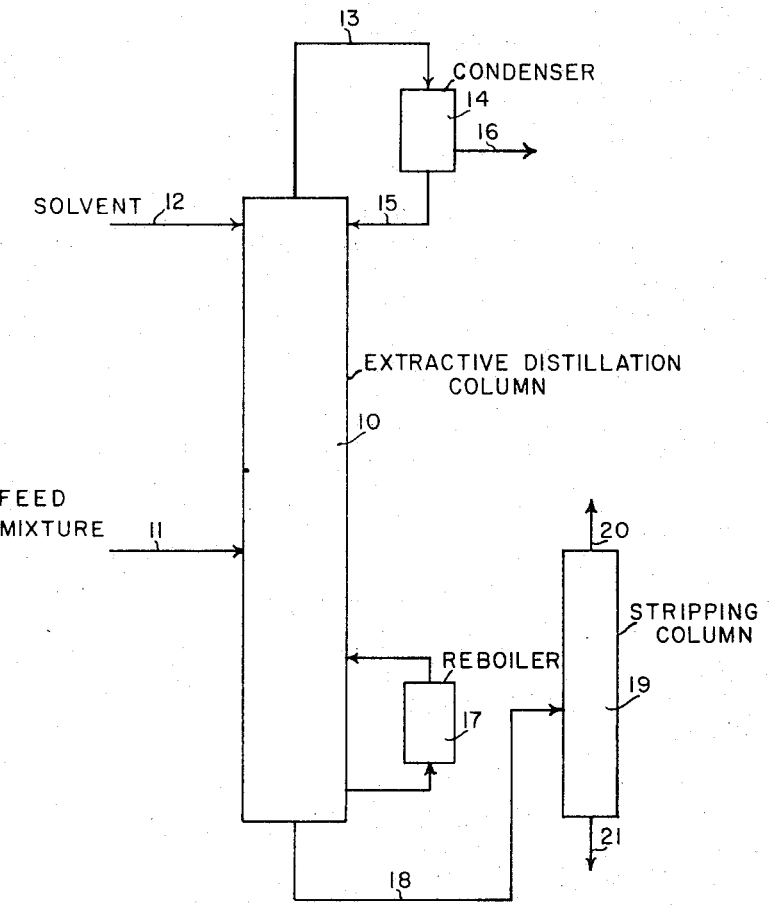

3,356,594
SEPARATION OF HYDROCARBONS OF VARYING DEGREES OF UNSATURATION BY EXTRACTIVE DISTILLATION
Earle C. Makin, Jr., St. Louis, and George D. Davis, Creve Coeur, Mo., assignors to Monsanto Company, St. Louis, Mo., a corporation of Delaware
Filed Dec. 21, 1964, Ser. No. 419,940
6 Claims. (Cl. 203—55)

ABSTRACT OF THE DISCLOSURE

A process for the separation of mixtures of hydrocarbons of varying degrees of unsaturation which comprises extractively distilling these mixtures in the presence of a solvent comprising 75 to 99 percent by weight of 2-methoxy-ethanol and 1 to 25 percent by weight of water.

---

This present invention relates to a process for the separation of hydrocarbons. More particularly, the present invention relates to a process for the separation of mixtures of hydrocarbons of varying degrees of unsaturation by extractive distillation. Specifically, the present invention relates to the separation of hydrocarbon mixtures by the selective removal of the more unsaturated hydrocarbon components therefrom by extractive distillation.

It has long been recognized that many hydrocarbon mixtures are virtually impossible to separate by ordinary distillation methods either because of similarity of boiling point or because of azeotrope formation. Among such mixtures are those containing azeotrope forming or similar boiling point hydrocarbons of varying degrees of unsaturation such as mixtures containing butadiene and butylenes. One of the means proposed for overcoming the deficiencies of ordinary distillation for separation of such mixtures is the alteration of the relative volatilities of the components of the mixtures by the addition of a solvent selective for the more unsaturated hydrocarbon components of the mixture. Probably one of the most widely known of such techniques involves the use of furfural alone or with water to separate butadiene and butylenes. However, because of its corrosiveness and its instability, furfural alone or with water has not found as wide acceptance as would otherwise be expected.

In the search for solvents to replace furfural in the separation of hydrocarbons of varying degrees of unsaturation, many solvents have been investigated. Some of these, such as dimethylformamide have found some prominence. However, literally thousands of chemical compounds and combinations thereof in existance today as well as many yet unsynthesized represent potential solvents to replace furfural in the separation of hydrocarbons according to degree of unsaturation. As yet, no acceptable means of predicting effectiveness of a given solvent for a given separation has been found. Therefore to find which of these solvents or combination of solvents and under what conditions the solvents are effective for the separation of hydrocarbons according to degree of unsaturation is a very tedious and difficult task.

It is an object of the present invention to provide a new and novel extractive distillation process for the separation of hydrocarbon mixtures containing hydrocarbons of varying degrees of unsaturation. Another object of the present invention is to provide a new and novel solvent system for the separation of hydrocarbon mixtures containing hydrocarbons of varying degrees of unsaturation by extractive distillation. It is another object of the present invention to provide a new and improved extractive distillation process and a solvent system for use therein whereby hydrocarbon mixtures containing hydrocarbons of varying degrees of unsaturation may be separated according to the degree of unsaturation. Additional objects will become apparent from the following description of the invention herein disclosed.

In fulfillment of these and other objects, it has been found that more unsaturated hydrocarbons may be more effectively separation from less unsaturated hydrocarbons by a process which comprises contacting a mixture of hydrocarbons of varying degrees of unsaturation with a solvent system comprised of 80 to 99 percent by weight of methyl cellosolve and 1 to 20 percent by weight of water at elevated temperatures and pressures sufficient to maintain the unabsorbed components of the hydrocarbon mixture in the vapor phase. Methyl "Cellosolve" is the trademark name for 2-methoxy-ethanol. Several very distinct advantages are provided by the solvent system and extractive distillation process of the present invention. The solvent system of the present invention is one which has a higher loading capacity for those hydrocarbons for which it has preferential selectivity as compared to the more well known solvent systems such as furfural and furfural-water. Further, the solvent system of the present invention permits this greater loading capacity without a significant decrease in selectivity between those hydrocarbons of differing degrees of unsaturation. Still other advantages of the solvent system and process of the present invention is that the problem of corrosion is substantially eleviated. Also, the solvent system of the present invention is considerably more stable than many of the more common solvents such as furfural and dimethylformamide. Additional advantages obtaining from the present solvent system and process will become apparent from the following description of the present invention.

To further describe the present invention, reference is made to the accompanying drawing which presents a schematic presentation of a preferred embodiment of the present invention. Referring to the drawing, a feed mixture containing hydrocarbons of varying degrees of unsaturation is introducted into extractive distillation column 10 by means of line 11. Most often the hydrocarbon feed mixture is introduced in the vapor phase. The solvent system of the present invention is introduced into column 10 usually in the liquid phase, through line 12 which is located at a point above line 11. The solvent flows downwardly through column 10, countercurrently contacting upwardly flowing vapors of the feed mixture. As the solvent and hydrocarbon feed contact one another, the more unsaturated hydrocarbons are preferentially absorbed. That portion of the feed mixture not absorbed by the solvent passes upwardly through extractive distillation column 10 and by means of line 13 passes into condenser 14. In condenser 14, the unabsorbed vapors are condensed and a portion of the condensed material returned to extractive distillation column 10 as reflux by means of line 15. The reminder of the condensed material is passed from condenser 14 by line 16 to its subsequent utilization. The solvent enriched with absorbed hydrocarbons passes downwardly through extractive distillation column 10 and is circulated through and heated in reboiler 17 which partially strips absorbed hydrocarbons from the solvent and vaporizes these hydrocarbons which then pass up through column 10. The solvent and absorbed hydrocarbons are removed from extractive distillation column 10 by means of line 18 and are passed to a stripping column 19 in which absorbed hydrocarbons are stripped from the solvent and taken overhead by means of line 20 to their future utility. The stripped solvent passes from stripping column 19 by means of line 21 by which it may be passed back to line 12 as recycle to column 10, or to further processing or other disposition.

In order to maintain the solvent system of the composition hereinafter described, it may be necessary to occasionally re-adjust the concentration of the components either by removing or adding water or methyl cellosolve. Such treatment is well within the ability of those skilled in the art and will most often take place in conjunction with stripping column 19 or as a separate treatment of the solvent after it has passed from stripping column 19 by means of line 21. In addition, it may be necessary to have more than one stripping column in order to adequately strip the absorbed more unsaturated hydrocarbons from the solvent. Determination of the number and efficiency of stripping columns to adequately purify the solvent of the absorbed more unsaturated hydrocarbons is well within the ability of those skilled in the art.

It will be immediately apparent to those skilled in the art that many modifications of the above-described method for carrying out the present invention may be made. So long as the modification requires the solvent system of the present invention as well as the process conditions hereinafter disclosed, said modifications are within the spirit and scope of the present invention.

In order to further describe and to illustrate the present invention, the following examples are presented. These examples are in no manner to be construed as limiting the present invention.

EXAMPLE I

A hydrocarbon mixture consisting of approximately 35.2 mole percent butadiene, 43.0 mole percent butene-1 and isobutene, 13.8 mole percent butene-2 and 8.0 mole percent butanes was placed in a distillation unit of approximately one theoretical plate efficiency. To this was added a solvent composition consisting of 90.0 percent by weight methyl Cellosolve and 10.0 percent by weight water. The weight ratio of solvent to hydrocarbon mixture was 3:1. The solvent-hydrocarbon mixture in the distillation unit was heated to a temperature of 140° F. and maintained at a pressure of 70.0 p.s.i.g. and refluxed until a constant composition vapor was obtained. The vapor phase was then sampled and found to have a composition of approximately 27.2 mole percent butadiene, 48.2 mole percent butene-1 and isobutene, 13.0 mole percent butene-2 (7.8% trans and 5.2% cis) and 11.6 mole percent butanes. The portion of the hydrocarbon mixture absorbed by the solvent was found to consist of 35.9 mole percent butadiene, 43.1 mole percent butene-1 and isobutene, 14.0 mole percent butene-2 (8.0% trans and 6.0% cis) and 7.0 mole percent butanes. The weight percent of the hydrocarbon mixture absorbed by the solvent was 13.91 which represented a solvent loading of 16.16 lbs. of hydrocarbons per 100 lbs. of solvent.

EXAMPLE II

Example I was substantially repeated with the exception that the distillation was carried out at a temperature of 160° F. and the pressure was maintained at 81.5 p.s.i.g. The vapor phase sample was composed of 30.6 mole percent butadiene, 49.1 mole percent butene-1 and isobutene, 11.8 mole percent butene-2 (6.9% trans and 4.9% cis) and 8.5 mole percent butanes. The portion of the hydrocarbon mixture absorbed by the solvent was found to consist of 38.5 mole percent butadiene, 43.7 mole percent butene-1 and isobutene, 12.6 mole percent butene-2 (7.0% trans and 5.6% cis) and 5.2 mole percent butanes. The weight percent of the hydrocarbon mixture absorbed by the solvent was 12.9 which represented a solvent loading of 14.8 lbs. of hydrocarbons per 100 lbs. of solvent.

EXAMPLE III

To demonstrate the advantages resulting from the solvent system of the present invention, a solvent comprised of 90% by weight methyl Cellosolve and 10% by weight water was compared with a solvent system comprised of 95% by weight furfural and 5% by weight of water in an extractive distillation unit of approximately one theoretical plate efficiency as to loading capacity at various solvent selectivity levels and as to selectivity at various solvent loadings. Solvent selectivity is defined in terms of the relative volatility of trans-butene-2 and butadiene in a feed mixture such as that of Example I in the presence of the solvent system and is calculated by the following equation:

$$\text{Relative volatility} = \frac{A/B}{C/D}$$

wherein A is the mole percent trans-butene-2 in the vapor phase, B is the mole percent trans-butene-2 in the liquid phase, C is the mole percent butadiene in the vapor phase and D is the mole percent butadiene in the liquid phase. The loading capacity represents the weight percent of total $C_4$'s absorbable by the solvent system from a feed mixture such as that of Example I. The following Table I presents the loading capacity obtainable with two solvents at various relative volatilities which Table III shows the selectivity as relative volatility of trans-butene-2 and butadiene with the two solvents at various loading capacities.

TABLE I

| Relative Volatility | Loading, Wt. Percent | |
|---|---|---|
| | Methyl"Cellosolve"-$H_2O$ | Furfural-$H_2O$ |
| 1.200 | 21.0 | 19.7 |
| 1.250 | 16.8 | 15.6 |
| 1.300 | 12.5 | 11.5 |

TABLE II

| Loading, Wt. Percent | Relative Volatility | |
|---|---|---|
| | Methyl"Cellosolve"-$H_2O$ | Furfural-$H_2O$ |
| 20 | 1.211 | 1.196 |
| 15 | 1.272 | 1.258 |
| 10 | 1.331 | 1.320 |

The above Tables I and II illustrate that both improved relative volatility and solvent loading are obtained by means of the present invention. In addition, it has been found that the methyl Cellosolve-water solvent system alleviates corrosion as a problem in the separation of hydrocarbons according to degree of unsaturation by extractive distillation in metal equipment.

EXAMPLE IV

A two-inch diameter Oldershaw fractionating column of approximately 140 trays is employed in separating a hydrocarbon mixture of substantially the same composition as the mixture of Example I. The hydrocarbon mixture is introduced into the Oldershaw column at a point 65 trays from the bottom of the column at a rate of 300 grams per hour. A solvent system comprised of 90 percent by weight methyl Cellosolve and 10 percent by weight water is introduced into the fractionating column at a point 130 trays from the bottom of the column at a rate such as to cause a 12.8:1 solvent to feed weight ratio. The column is operated with a 2:1 reflux ratio (wt. reflux to wt. of hydrocarbon feed). The distillate obtained overhead is substantially free of butadiene. The solvent-butadiene mixture is continuously taken from the bottom of the column and subjected to distillation from which the butadiene is obtained in a concentration of approximately 89.5 percent, the balance consisting of essentially cis-butene-2 subsequently separated from the butadiene by fractionation.

The solvent system of the present invntion is one comprised of 75 to 99 percent by weight of methyl Cellosolve and 1 to 25 percent by weight of water. A preferred solvent system however, is one which has a composition of 85 to 95 percent by weight of methyl Cellosolve and 5 to 15 percent by weight of water.

Any conventional distillation equipment may be used in practicing the invention herein disclosed. The present invention may be carried out either by batch distillation as illustrated in Examples I and II, or as a continuous distillation as is illustrated by Example IV. Any conventional fractionating equipment may be used. The fractionation unit may be a packed column or it may be a column equipped with perforated plates, bubble trays or a system of baffles. The number of theoretical plates in the fractionating unit will depend upon the efficiency of separation desired, the precise composition of the feed mixture, the quantity of solvent, the reflux ratio and other related factors well known to those skilled in the art. The theoretical plate efficiency may be as low as 1 as illustrated in Examples I and II, or may be as high as 100 and higher. The preferred fractionating column is one providing for countercurrent vapor liquid contact under reboiling and refluxing conditions and generally will have a theoretical plate efficiency of 25 to 150.

In practicing the present invention according to its preferred mode of practice, the feed mixture is introduced into the fractionating column at a point approximate to or below the mid-point of the column while the solvent is introduced at a point above the entry point of the feed mixture. The solvent most often is introduced into the extractive distillation column at a point at or near the top of the column. Generally, it will be preferred that the feed mixture be introduced at a point in the fractionating column of from ⅕ to ⅗ of the height of the column from the bottom of the column and that the solvent be introduced at a point no greater than ⅓ of the height of the column as measured from the top of the column.

The quantity of solvent required in the present extractive distillation process in order to accomplish the desired separation will vary over relatively wide limits depending upon the efficiency of the separation desired and the equipment used. Generally, no less than one part by volume of solvent per part by volume of feed mixture will be uesd. The quantity of solvent may range as high as 10 to 20 volumes of solvent per volume of feed mixture. Too large an excess of solvent is to be avoided in the preferred mode of practice of the present invention.

The reflux ratio in which the column is operated will vary according to the theoretical plate efficiency of the column, the solvent to feed ratio, composition of the feed mixture and the separation desired. Generally, however, reflux ratios of 0.01:1 to 20:1 will suffice. It is preferred, however, that the reflux ratio be within the range of 0.5:1 to 5:1.

The present extractive distillation process may be carried out at atmospheric pressure or at subatmospheric pressures as well as at superatmospheric pressures. Generally, pressures within the range of from atmospheric to 200 p.s.i.g. will be used. Preferably, however, the pressure will be within the range of from approximately 40 to 80 p.s.i.g.

The temperatures at which the present extractive distillation process may be operated will vary quite widely depending upon the hydrocarbon mixture being separated. Generally, in the usual practice of the present invention, temperatures within the range of 0 to 400° F. will be employed. However, the temperatures optimum for separting, for example, a $C_3$ hydrocarbon mixture are substantially different from those optimum for a $C_1$ hydrocarbon mixture. Optimum temperatures may be readily determined by those skilled in the art having the present teachings before them. When the present invention is utilized in accordance with the particularly preferred utility hereinafter defined, temperatures of 100 to 300° F. are commonly employed.

The present invention is primarily directed to the separation of less unsaturated hydrocarbons from more unsaturated hydrocarbons. According to the present invention, olefins may be separated from paraffins, diolefins, acetylenes, etc., olefins may be separated from diolefins, triolefins, acetylenes, etc., diolefins may be separated from acetylenes, etc. Usually, the hydrocarbon mixtures separated according to the present extractive distillation process are comprised primarily of hydrocarbons having no greater than 7 carbon atoms per molecule. In the preferred practice, the present invention finds its greatest utility in the separation of hydrocarbon mixtures comprised of hydrocarbons of varying degrees of unsaturation and having 3 to 5 carbon atoms per molecule. In the particularly preferred practice of the present invention, the present invention is used for the separation of diolefinic hydrocarbons of 3 to 5 carbon atoms from mono-olefinic and paraffinic hydrocarbons of 3 to 5 carbon atoms.

The more unsaturated hydrocarbons absorbed by the solvent composition of the present invention may be recovered from the solvent composition by any of the means well known to the art. These absorbed hydrocarbons may be removed from the solvent by a flash distillation, by fractionation, by stripping with a gas or any other conventional means.

What is claimed is:
1. A process for the separation of mixtures of hydrocarbons of varying degrees of unsaturation by extractive distillation, said mixtures containing hydrocarbons having no greater than 7 carbon atoms per molecule, and which comprises continuously introducing said mixture into an intermediate section of a fractionating column, continuously introducing a solvent into the fractionating column at a point above the point of introduction of said mixture so that the solvent flows counter-current to and intimately contacts the ascending vapors of said mixture, withdrawing overhead a hydrocarbon fraction substantially richer in hydrocarbons of a lesser degree of unsaturation than said mixture and removing from the bottom of said column a solvent fraction rich in the more unsaturated hydrocarbons of said mixture, said solvent introduced in said fractionating column being one comprised of 75 to 99 percent by weight of 2-methoxyethanol and 1 to 25 percent by weight of water.

2. The process of claim 1 wherein the volume ratio of solvent to feed is at least 1:1.

3. The process of claim 1 wherein the extractive distillation is carried out at a pressure within the range of atmospheric pressure to 200 p.s.i.g.

4. The process of claim 1 wherein the extractive distillation is carried out at a temperature within the range of 0 to 400° F.

5. The process of claim 1 wherein said fractionating column is one of 25 to 150 theoretical plate efficiency.

6. The process of claim 1 wherein a reflux rate of 0.01:1 to 20:1 is used.

References Cited

UNITED STATES PATENTS

| | | | |
|---|---|---|---|
| 2,215,915 | 9/1940 | Cope et al. | 203—64 X |
| 2,273,923 | 2/1952 | Bludworth | 203—64 X |
| 2,325,379 | 7/1943 | Durrum | 203—63 X |
| 2,365,912 | 12/1944 | Souders | 203—63 |
| 2,366,361 | 1/1945 | Semon et al. | 203—63 X |
| 2,415,192 | 2/1947 | Rittenhouse | 203—63 X |
| 2,456,561 | 12/1948 | Lake et al. | 203—64 X |
| 2,672,436 | 3/1954 | Foxon | 203—55 |
| 2,721,170 | 10/1955 | Johnson | 203—60 X |

FOREIGN PATENTS 370,771    4/1932    Great Britain.

NORMAN YUDKOFF, *Primary Examiner.*

F. E. DRUMMOND, *Assistant Examiner.*